(12) United States Patent
Bradbury et al.

(10) Patent No.: US 6,176,368 B1
(45) Date of Patent: *Jan. 23, 2001

(54) PASSIVE DUST CONTROL CIRCULATION COMPARTMENT HAVING SECONDARY DUST CONTROL FEATURES

(75) Inventors: Steven Arthur Bradbury, Longmont, CO (US); Garren Ewers Tooker, Brookings, OR (US)

(73) Assignee: Air Control Science, Inc., Boulder, CO (US)

( * ) Notice: Under 35 U.S.C. 154(b), the term of this patent shall be extended for 0 days.

This patent is subject to a terminal disclaimer.

(21) Appl. No.: 09/435,406

(22) Filed: Nov. 5, 1999

Related U.S. Application Data

(63) Continuation of application No. 09/013,022, filed on Jan. 26, 1998, now Pat. No. 6,000,533.

(51) Int. Cl.[7] .................................................. B65G 21/00
(52) U.S. Cl. ..................................... 198/860.5; 198/860.3
(58) Field of Search .......................... 198/860.3, 860.5, 198/860.1, 525, 735.3, 735.5

(56) References Cited

U.S. PATENT DOCUMENTS

| 5,129,508 | * | 7/1992 | Shelstad | 198/860.5 |
| 6,000,533 | * | 12/1999 | Bradbury et al. | 198/860.5 |

FOREIGN PATENT DOCUMENTS

| 34 41 411 A1 | 5/1985 | (DE) . |
| 0 714 837 A1 | 6/1996 | (EP) . |

* cited by examiner

Primary Examiner—James R. Bidwell
(74) Attorney, Agent, or Firm—Duft, Graziano & Forest, P.C.

(57) ABSTRACT

A system for providing passive dust control for a transfer of bulk material from a first station to a second station. A dust containment housing encloses a first station and station. A bulk material is transferred from the first station to the second station inside the dust containment housing. A region of low pressure is provided inside the dust containment housing. Air carrying suspended particles of bulk material flow from a region of high air pressure generated by the transfer of bulk material to the region of low air pressure inside the housing. The suspended particles of bulk material either remain suspended in the air inside the housing or settle out of the air into the bulk material inside the housing.

29 Claims, 7 Drawing Sheets

ORIGINAL

*ORIGINAL*

ORIGINAL

PASSIVE DUST CONTROL CIRCULATION COMPARTMENT HAVING SECONDARY DUST CONTROL FEATURES

CROSS REFERENCED APPLICATIONS

This application is a continuation in part of U.S. Pat. No. 6,000,533 titled "Passive Dust Control System" filed as application Ser. No. 09/013,022 on Jan. 26, 1998. The above referenced application is hereby incorporated by reference as if the application was set out in this application.

FIELD OF THE INVENTION

The present invention relates to the provision of a dust containment housing that passively prevents dust from escaping from the housing during a transfer of bulk material from a first station to a second station. More particularly, the present invention relates to providing a region of low air pressure in a dust containment housing to cause air to flow from a region of high air pressure generated by a transfer of bulk material to the region of low air pressure inside the housing. Still more particularly, the present invention relates to the provision of a circulation compartment inside the housing to create a circulation path for the induced air flow inside the housing from a termination area of the transfer back to the first station.

PROBLEM

One of the most significant problems facing today's industrial society is air pollution. It is commonly known that air pollution is among the causes of many environmental problems, such as the greenhouse effect, and many health problems, such as silicosis and pneumoconiosis. As society has become aware of these environmental and health problems caused by air pollution, methods have been sought to reduce the amount of pollution released into the air.

One type of air pollution is dust emitted into the atmosphere. Dust is comprised of particles of a bulk material, such as hard or soft ores, that are suspended in the air. One cause of dust emissions is the transfer of a bulk material from a first station to a second station. The bulk material is typically transferred from the first station to the second station by causing the bulk material to fall from the first station to the second station or by projecting the bulk material from the first station to the second station.

A stream of bulk material is formed by the material falling or being projected from the first station to the second station. The individual particles in the stream of bulk materials impart a frictional drag on the surrounding air. The surrounding air begins to flow in the direction of the material stream and attains a velocity approaching the velocity of the material stream. This is called an induced air flow. At the end of the fall, the bulk material is suddenly stopped and compacted the material caused by impact of the material stream within the area of the second station. The velocity pressure of the induced air flow is converted to static pressure by the impact of the bulk material. A region of high air pressure is created by the static pressure. Air in the region of high air pressure must flow to a region of lower air pressure. As the air flows from the region of high air pressure to the region of lower air pressure, small particles of the bulk material are suspended in the air. In an open system, the movement of the air is from high pressure to low pressure is evidenced by a dust cloud billowing from the termination area of the second station.

One common dust control system is a housing enclosing a first station, a second station, and the material stream between the first and second stations. The housing guides the bulk material and prevents dust from escaping. A typical housing has an inlet near the first station to receive the bulk material at the first station and an outlet near the second station to transport the bulk material from the second station out of the housing. In addition to the inlet and outlet, a dust containment housing typically has several tolerance openings around moving and vibrating components of the first and second stations.

It is a problem that the primary function of the housing is to guide flowing bulk material from the first station to the second station and not to prevent dust emissions. When a region of high air pressure is generated proximate the second station by the impact of the bulk material terminating the induced air flow, the dust laden air in the region of high air pressure flows through openings, such as the outlet, near the second station to a region of lower air pressure outside the housing. The air flowing out an opening carries the suspended particles of bulk material out of the opening.

One method for preventing air from carrying dust out of openings in the housing is to exhaust the induced air flow to a filtration system. A filtration system has a vacuum or fan to create a negative air pressure in a duct leading to the filtration system. An entry to the duct is attached to the housing. The air flows from the region of high air pressure flows into the duct having a negative air pressure and to the filtration system instead of out of the openings in the housing. In the filtration system, the air passes through a filter which removes the suspended particles from the flowing air. The filtered air is then released to the outside environment.

Filtration systems are not desirable for several reasons. A first reason that a filtration system is undesirable is the capital cost required to add the filtration system to a housing. One factor in the prohibitive capital cost of a filtration system is the need to incorporate a duct system to the filtration system from the housing. This increases the cost of the housing and causes many design and operation problems.

A second reason that filtration systems are not desirable is the high maintenance required to maintain the filtration system in proper working order. One cause of the need for high maintenance is that the bulk material caught by the filter must be removed from the filter using a shaker or other device. A second cause of the high maintenance is that the entire filter must be periodically replaced in order to maintain the same efficiency level for the filtration system.

A third reason that filtration systems are not desirable is the high energy consumption by the filtration systems. A great amount of energy is needed to create a region of negative air pressure in the ducts that will cause the air to flow through the filtration system. A further reason that filtration systems are undesirable is that an improperly working filter system will emit dust.

A second form of dust emission control is a dust suppression system. A dust suppression system can be used either in an open or a closed bulk material transfer system. In a dust suppression system, the bulk material is wetted with a surfactant such as foam or water. The surfactant agglomerates with the fine particles of the bulk materials. The agglomeration of the fine particles and surfactant increases the weight of the fine particles. The increased weight prevents the particles from being suspended in the air flowing from the region of high air pressure to the region of low air pressure. It is a problem that dust suppression systems are typically not as effective as filtration systems in preventing dust from being emitted. Further, the capital cost of a dust suppression system is comparable to the capital cost of a filtration system that has a comparable emission control performance.

Dust suppression systems that are as effective as filtration systems wet the bulk material with a mist having droplets approaching the size of the dust particles. However, these efficient dust suppression systems are as expensive to install as are the filtration systems and typically have higher maintenance costs. A high level of maintenance is needed to maintain production of the particle sized droplets in the mist and to assure that even very small particles of bulk material are agglomerated.

One disadvantage of a dust suppression system is that dust suppression systems have numerous problems in cold temperatures. In order to keep the surfactant from freezing, a dust suppression system must be heated or well insulated. The wetted bulk material can also freeze which causes plugging in the transfer system. These problems lead to excessive maintenance and extra cost to maintain efficiency in the dust suppression system in cold temperatures.

There is a long felt need in the art for an inexpensive and maintenance-free dust control system.

SOLUTION

The above and other problems are solved and an advance in the art is made by the provision of a passive dust control system. In accordance with the present invention, moving air carrying suspended particles of bulk material inside a dust containment housing is prevented from escaping through leakage areas in the dust containment housing. Induced air flowing within the dust containment housing is circulated inside the dust containment housing to prevent the air from escaping through leakage areas in the dust containment housing. A region of low air pressure is provided inside the dust containment housing. As a region of high air pressure is generated inside the dust containment housing, the air flows from the region of high air pressure to the region of low air pressure inside the dust containment housing. As the air flows into the region of low air pressure, the velocity of the flowing air dissipates and the particles suspended in the air either remain suspended in slower moving air in the region of low air pressure or fall back into the bulk material at a second station.

In one preferred exemplary embodiment of the present invention, a passive dust control system is provided in the following manner. A dust containment housing encloses a first station, such as a first conveyer belt and a second station, such as a second conveyer belt. The first station is at a first elevation inside the dust containment housing and the second station is at a second elevation that is lower than the first elevation inside the dust containment housing. Bulk material is transferred from the first station to the second station inside the dust containment housing by dropping or projecting the bulk material from the first station to the second station.

Dust control for the transfer of bulk material is provided in the following manner. A stream of bulk material is formed by the material falling or projected from the first station to the second station. The individual particles in the stream of bulk materials impart a frictional drag on the surrounding air. The surrounding air begins to flow in the direction of the material stream and attains a velocity that approaches the velocity of the material stream. This is called an induced air flow. At the end of the fall, the bulk material is suddenly stopped and compacted by impact with the second station. The velocity pressure of the induced air flow is converted to static pressure termination of the induced air flow caused by the impact of the bulk material with the second station. A region of high air pressure is created by the static pressure. Air in the high air pressure must flow to a region of lower air pressure. As the air flows from the region of high pressure to the region of lower pressure, small individual particles of the bulk material are suspended in the flowing air.

Air must flow from a region of high air pressure to a region of lower air pressure. Under normal conditions, the only regions of lower air pressure are outside of the dust containment housing and the air in the region of high air pressure flows out of a leakage area in the dust containment housing to a region of lower air pressure outside the housing. The particles of dust are carried out of the dust containment housing with the flowing air.

The present invention provides a region of low air pressure inside the housing. The air in the region of high air pressure flows into the region of low air pressure inside the dust containment housing. This prevents the air containing the suspended particles of bulk material from flowing out of the housing.

In the preferred exemplary embodiment, the region of low air pressure is provided by circulation compartment inside the dust containment housing. The circulation compartment substantially encloses the bulk material stream and a termination area of the bulk material stream at the second station. This allows the flowing air to circulate back from the termination area to a beginning point of the material stream at the first station. As the material falls to second station, the region of high air pressure is generated. The pressurized air flows outward into the circulation compartment containing a region of low air pressure. As the air flows into the circulation compartment, the velocity of the flowing air dissipates. The particles of bulk material either remain suspended in the slower moving air inside the circulation compartment or settle out of the air into the bulk material in the material stream or at the second station.

Air continues to flow into the circulation compartment adding more particles of bulk material into the circulation compartment. Eventually, the air in the circulation compartment can reach a saturation point for the suspended particles. If the air in the circulation compartment becomes saturated with particles of bulk material, agglomeration will create an equilibrium at a certain concentration of suspended particles. In agglomeration, the smaller particles of bulk material collide and form bigger, heavier particles. The bigger, heavier particles then fall from the air in the circulation compartment and back into the bulk material in the material stream or at the second station.

Sometimes as air is flow from the region of high air pressure to the region of low air pressure inside the compartment, eddies occur in the air flow. The eddies are generated by turbulent non-laminar flow near the impact area. The eddies suspend some particles near the impact point and prevent the particles from settling back into the material. To alleviate eddies in the induced air flow, laminar directions guides are inserted in the circulation compartment of a preferred exemplary embodiment. Laminar directional guides are veins inside the compartment which physically force the induced airflow to flow in an upward direction into the circulation compartment.

These and other advantages of a passive dust control system will be apparent to those skilled in the art upon reading of the discussion below in combination with the accompanying drawings.

DETAILED DESCRIPTION

Figure 1:
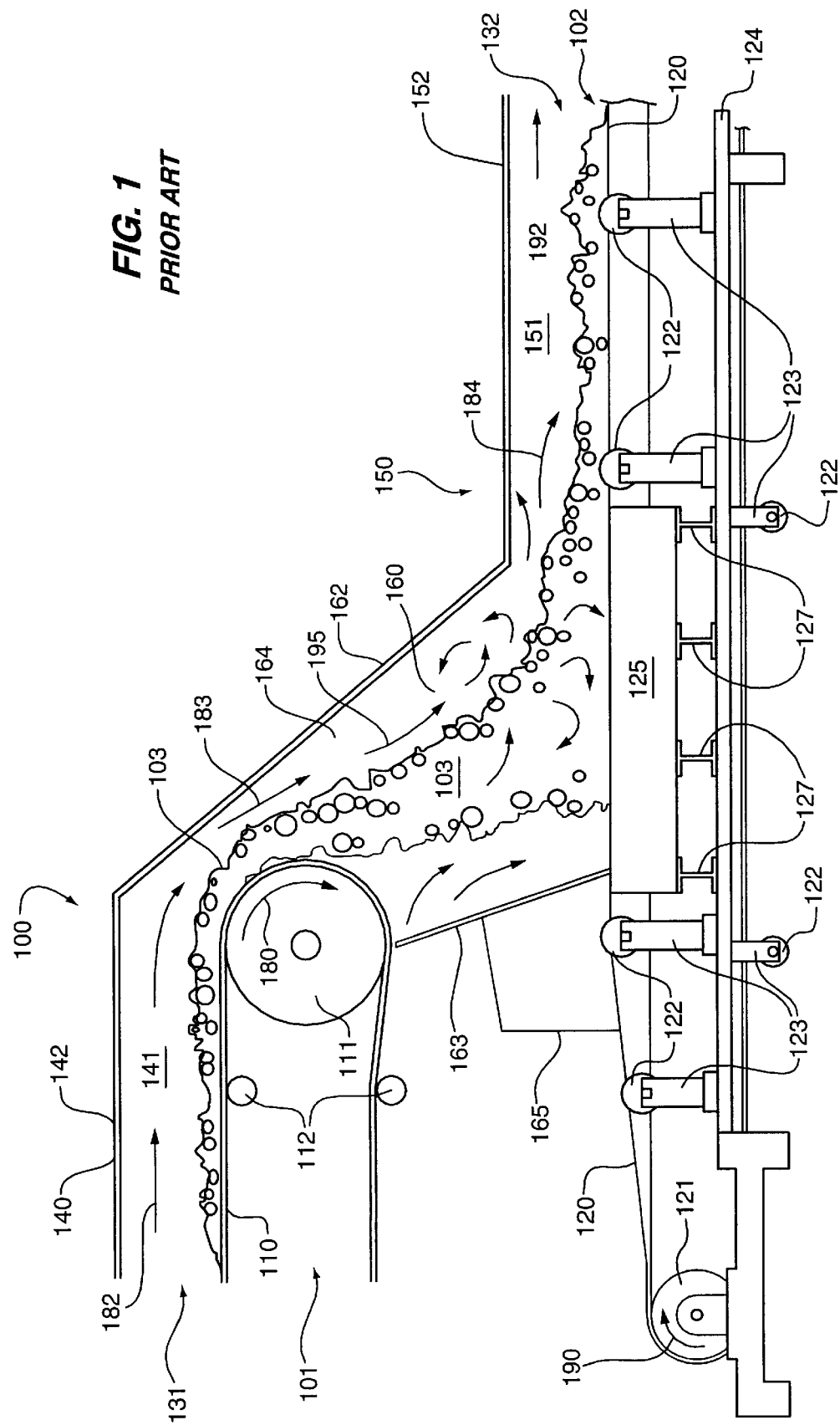
FIG. 1 illustrates a cross sectional view of a dust containment housing in the prior art.

FIG. 1 illustrates a cross sectional view of a prior art dust containment housing 100. Dust containment housing 100 encloses first station 101 and second station 102 to prevent dust emissions from housing 100 during a transfer of bulk material 103 from first station 101 to second station 102 inside housing 100. In FIG. 1, first station 101 and second station 102 are represented by conveyor belt systems. However, other systems can be used by first station 101 and second station 102 to transport bulk material 103. Some examples of other systems include hoppers, crushers, screens, bins, silos, apron feeders and vibrating feeders.

First station 101 is at a first elevation in housing 100. In first station 101, conveyor belt 110 rotates about head pulley 111 and a tail pulley (not shown) in a direction indicated by arrow 180. Head pulley 111 and/or the tail pulley (not shown) are rotated by a motor (not shown) to rotate conveyor belt 110. Idler pulleys 112 guide and support conveyor belt 110 between head pulley 111 and the tail pulley (not shown). Bulk material 103 is placed on conveyor belt 110 which transports bulk material 103 from a prior processing station into housing 100 in the direction indicated by arrow 182.

Second station 102 is at a second elevation that is lower than the first elevation of first station 101. In second station 102, conveyor belt 120 rotates about a head pulley (not shown) and tail pulley 121 in the direction indicated by arrow 190. The head pulley and/or tail pulley 121 are rotated by a motor (not shown) to rotate conveyor belt 120. Idler pulleys 122 guide and support conveyor belt 120 between the head pulley (not shown) and tail pulley 121. Idler pulley supports 123 affix idler pulleys 122 to base 124. Impact bed 125 is positioned under conveyor belt 120 at a point that the bulk material 103 lands on second station 102 to add additional support to conveyor belt 120. Supports 127 affix impact bed 125 to base 124. Bulk material 103 is placed on conveyor belt 120 which moves bulk material 103 to a subsequent processing station outside dust containment housing 100 in the direction indicated by arrow 192.

Bulk material 103 is carried by conveyor belt 110 in the direction indicated by arrow 182. Conveyor belt 110 carries bulk material 103 into dust containment housing 100 through inlet 131. As conveyor belt 110 rotates about head pulley 110, bulk material 103 drops from an end of conveyor belt 110 in the direction indicated by arrow 183. Bulk material 103 then falls from the first elevation to the second elevation and lands on conveyor belt 120 of second station 102. Conveyor belt 120 moves the bulk material 103 that lands on conveyor belt 120 in the direction indicated by arrow 192. The bulk material 103 on conveyor belt 120 then exits housing 100 through outlet 132.

Housing 100 encloses first station 101, second station 102, and chute 160 defining a path for bulk material 103 to fall from first station 101 to second station 102. Upper skirt 140 encloses first station 101. First upper skirt side wall 141 and second upper skirt side wall (not shown) are substantially parallel to the longitudinal axis of conveyor belt 110 and are on opposing sides of conveyor belt 110. Upper skirt hood 142 is substantially parallel to the surface of conveyor belt 110 carrying bulk material 103 and extends from first skirt side wall 141 to the second upper skirt side wall (not shown) and is above a top side of cover belt 110. Inlet 131 is an opening in upper skirt 140 to allow conveyor belt 110 to carry bulk material 103 into housing 100.

Lower skirt 150 encloses second station 102. First lower skirt side wall 151 and second lower skirt side wall (not shown) are substantially parallel to the longitudinal axis of conveyor belt 120 and on opposing sides of conveyor belt 120. Lower skirt hood 152 is parallel to the surface of conveyor belt 120 carrying bulk material 103 and is above a top side of conveyor belt 120. Lower skirt hood 152 also extends from first lower skirt side wall 151 to the second lower skirt side wall (not shown). Outlet 132 in lower skirt 150 allows conveyor belt 120 to remove bulk material 103 from housing 100.

Four walls of housing 100 define chute 160 that provides a path for bulk material 103 from first station 101 to second station 102. A front chute wall 162 connects a first end of upper skirt hood 142 and a second end of second lower skirt hood 152. Front chute wall 162 is also slanted inward from lower skirt hood 152 to upper skirt hood 142. Back loading plate 163 extends from a bottom surface of conveyor belt 110 to a top surface of conveyor belt 120 and from first chute side wall 164 to a second chute side wall (not shown). A tail box 165 on the exterior side of back loading plate 163 prevents dust from being emitted from a back side of the chute. First chute side wall 164 extends from an end of first upper skirt side wall 141 to an end first lower skirt side wall 151 and from a first side of front chute wall 161 to a first side of back loading plate 163. A second chute side wall (not shown) extends from second upper skirt side wall (not shown) to second lower skirt side wall (not shown) and from a second side of front chute wall 162 to a second side of back loading plate 163. Bulk material 103 falls through the chute inside housing 100 from first station 101 to second station 102. Dust is generated and emitted from housing 100 in the following manner. A stream of bulk material 103 is formed by bulk material 103 falling or being projected from first station 101 to second station 102. The individual particles in the stream of bulk material 103 impart a frictional drag on the surrounding air. The surrounding air begins to flow in the direction indicated by arrow 195 with a velocity approaching a velocity of the stream of bulk material 103. This is called an induced air flow. At the end of the fall, bulk material 103 suddenly stops and compacts by impact with the second station 102. The velocity pressure of the induced air flow is converted to static pressure by the termination of the induced air flow caused by the impact of the bulk material with the second station. A region of high air pressure is created by the static pressure. Air in the high air pressure must flow to a region of lower air pressure. As the air flows from the region of high pressure to the region of lower pressure small individual particles of the bulk material are suspended in the air.

The only region of low air pressure is outside housing 100. The air in the region of high air pressure flows through a leakage area in housing 100, such as outlet 103, to the region of lower air pressure outside housing 100. In FIG. 1 the movement of the air out of outlet 103 is indicated by arrow 184. The flowing air carries the suspended particles of bulk material 103 out of housing 100.

Figure 2:
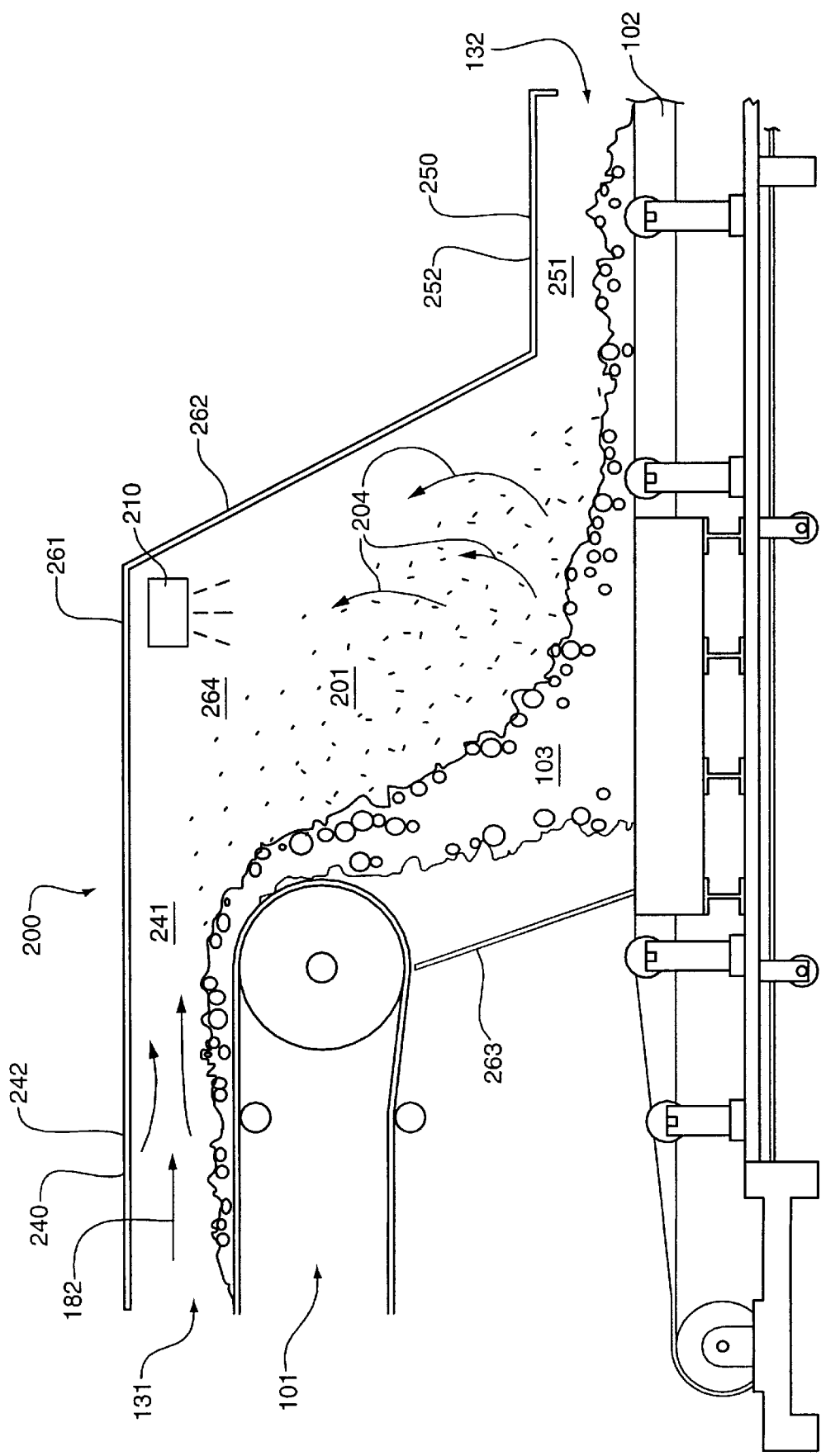
FIG. 2 illustrates a cross sectional view of a first exemplary embodiment of the present invention.

The present invention described in FIG. 2 provides a passive dust control system for preventing particles of bulk material 103 from being emitted from a dust containment housing 200. A region of low air pressure inside the housing is provided by the present invention. The air in the region of high pressure inside dust containment housing 200 flows to the region of low air pressure inside the housing. The particles either remain suspended in slowing moving air in the region of low air pressure or fall back into the bulk material 103 in the material stream or at the second station.

FIG. 2 illustrates a preferred exemplary embodiment of the present invention. First station 101 and second station 102 are identical to first station 101 and second station 102 as described in FIG. 1. It is understood that first station 101 and second station 102 are depicted as conveyor belt systems for exemplary purposes only and that the present invention can be used with other transfer systems, such a hopper and receiving buckets. Housing 200 provides a circulation compartment 201 instead of a chute that is provided by housing 100. Circulation compartment 201 provides a region of low air pressure inside housing 200. Preferably, the region of low air pressure has a lower air pressure than the air outside housing 200. This forces the air in the region of high air pressure to flow to the region of low air pressure in circulation compartment 201 and prevents the air in the region of high air pressure from flowing out of an opening in housing 200.

Housing 200 substantially encloses first station 101, second station 102, and circulation compartment 201 which contains the dust from the transfer of bulk material 103 from first station 101 to second station 102 inside housing 200. Supports (Not Shown) attach to an exterior of housing 200 and hold housing 200 in place over first station 101 and second station 102.

Upper skirt 240 of housing 200 substantially encloses first station 101. First upper skirt side wall 241 and second upper skirt side wall (not shown) are substantially parallel to the longitudinal axis of conveyor belt 110 and are on opposing sides of conveyor belt 110. Upper skirt hood 242 is substantially parallel to a surface of conveyor belt 110 carrying bulk material 103, is above a top side of conveyor belt 110, and extends from first upper skirt side wall 241 to the second upper skirt side wall (not shown). Inlet 131 in upper skirt 240 allows conveyor belt 110 to carry bulk material 103 inside housing 200 in the direction indicated by arrow 182.

Lower skirt 250 substantially encloses second station 102. First lower skirt side wall 251 and second lower skirt side wall (not shown) are substantially parallel to the longitudinal axis of conveyor belt 120 and on opposing sides of conveyor belt 120. Lower skirt hood 252 is substantially parallel to a surface of conveyor belt 120 carrying bulk material 103, is above a top side of conveyor belt 120, and extends from first lower skirt side wall 251 to the second lower skirt side wall (not shown).Outlet 132 in lower skirt 250 allows conveyor belt 120 to carry bulk material 103 out of housing 200 in the direction indicated by arrow 192.

Instead of defining a chute 160 (Shown in FIG. 1) to provide a path of bulk material 103 from first station 101 to second station 102, dust containment housing 200 defines a circulation compartment 201 to enclose the falling bulk material 103. Circulation compartment 201 is defined by five compartment walls. A top side compartment wall 261 extends outward from a first end of upper skirt hood 242 over second station 102. A front side compartment wall 262 connects a first end of lower skirt hood 252 to a first end of top side compartment wall 261 and is slanted inwards from lower skirt hood 252 to top side compartment wall 261. Back loading plate 263 extends from a bottom side of conveyor belt 110 to a top side of top of conveyor belt 120 and extends from first compartment side wall 264 to a second compartment side wall (not shown). First compartment side wall 264 extends from a first side first upper skirt side wall 242 to a first side of first lower skirt side wall 252, from upper compartment wall 261 to at least conveyor belt 120 and from front side compartment wall 262 to back side loading plate 263. The second compartment side wall (not shown) extends from the second upper skirt side wall (not shown) to the second lower skirt side wall (not shown), from upper compartment wall 261 to at least conveyor belt 120 and from front side compartment wall 262 to back side loading plate 263. The passive dust control is provided by circulation compartment 201.

Figure 3:
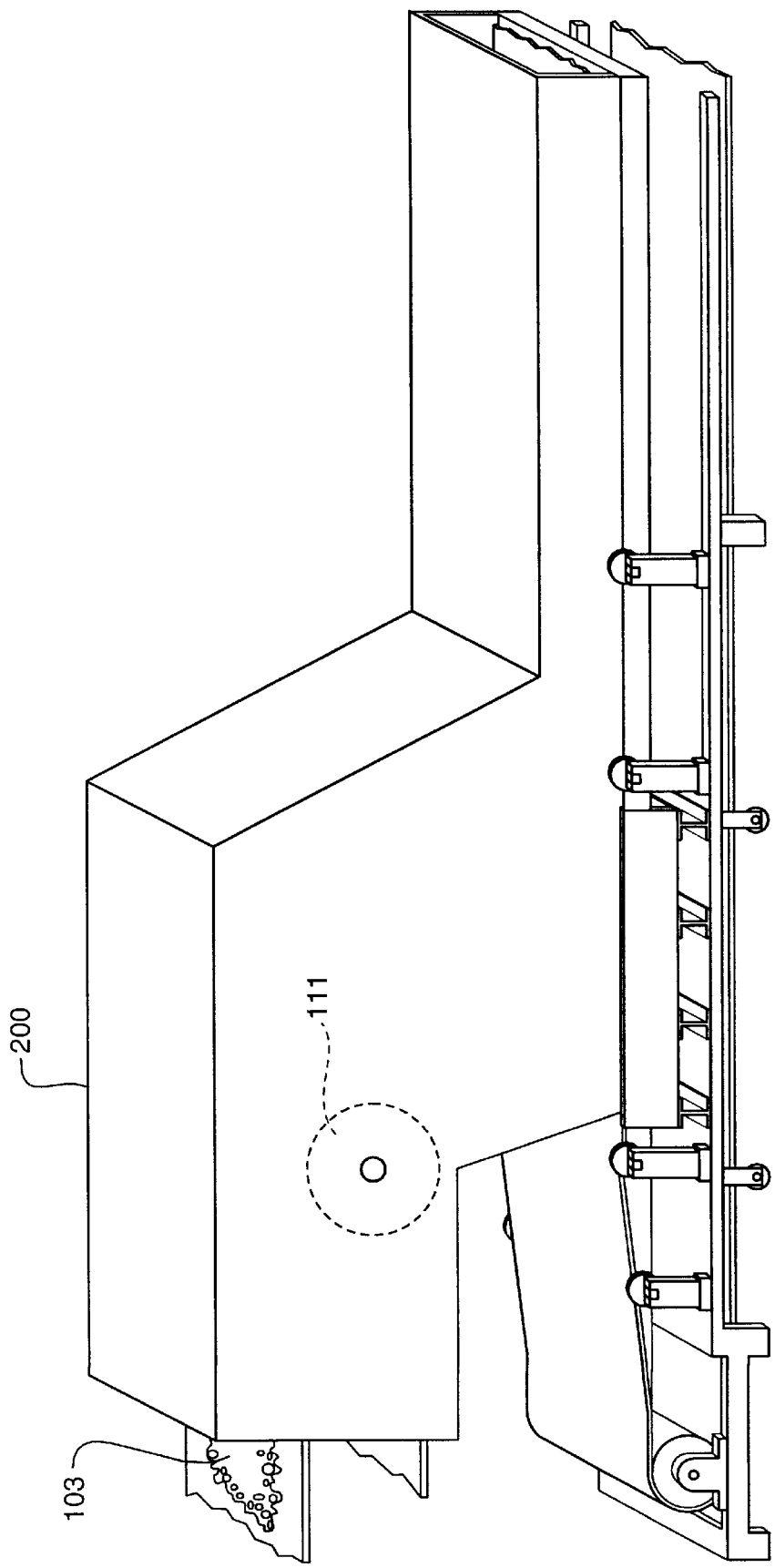
FIG. 3 illustrates an exterior view of the first exemplary embodiment of the present invention.

FIG. 3 illustrates an external view of housing 200. As shown, housing 200 completely encloses the transfer point of bulk material 103 from first station 101 (shown in FIG. 2) to second station 102 (Shown in FIG. 3). A dotted line representation of head pulley 111 is provided to show the end of first station 101 (Shown in FIG. 2). Housing 200 encloses circulation compartment 201 (Shown in FIG. 2) which extends outwards from first station 101 (Sown in FIG. 2) over second station 102 (Shown in FIG. 2) forming a circulation compartment. Air inside housing 200 flows from a region of high pressure generated by the transfer of bulk material 103 into the circulation compertment instead of flowing out of outlet 132.

As illustrated in FIG. 2, circulation compartment 201 provides a region of low pressure inside housing 200. The air carrying suspended particles inside housing 200 flows inside housing 200 instead of flowing out of housing 200. The circulation of the air occurs in the following manner. A stream of bulk material 103 is formed by bulk material 103 falling or being projected from first station 101 to second station 102. The individual particles in the stream of bulk material 103 impart a frictional drag on the surrounding air. The surrounding air begins to flow in the direction indicated by arrow 195 with a certain velocity pressure. This is called an induced air flow. At the end of the fall, bulk material 103 suddenly stops and compacts by impact with a termination area of the second station 102. The velocity pressure of the induced air flow is converted to static pressure by the impact of the bulk material. A region of high air pressure is created by the static pressure.

The air in the region of high air pressure must flow to a region of lower air pressure. Circulation compartment 201 provides a large amount of space in housing 200 having a lower air pressure than the air pressure generated by bulk material 103. The air in the area of high air pressure flows from the generated region of high air pressure inside housing 200 into circulation compartment 201 as indicated by arrows 204. This prevents most if not all of the air in the region of high air pressure from flowing out of a leakage area, such as outlet 132 near second station 102.

In the preferred embodiment, circulation compartment 201 is above the termination area at second station 102 and is between first station 101 and second station 102. As air flows from the region of high air pressure into the region of low air pressure, the air move towards first station 101. This allows the air to again become part of the induced air flow caused by falling or projecting of bulk material 103 from first station 101 to second station 102. A circular flow of air in housing 200 in a direction indicated by arrow 290 is created by the flowing air. This reduces the air that flows through housing 200 from inlet 131 to outlet 132.

In order to relieve the region of high pressure generated by the induced air flow, circulation compartment 201 must have a volume that is large enough to create a region of low air pressure that has a lower air pressure than any leakage area in dust containment housing 200. In order to assure that dust laden air does not escape from dust containment housing 200, the preferred embodiment of circulation compartment 201 is sized to have a volume that creates a flow resistance that is ten times smaller than the flow resistance friction loss of air flowing through dust containment housing 200 hereinafter referred to as flow-through induced air.

To properly size dust containment compartment 201, the frictional loss of the flow-through induced air must be calculated. One manner for determining the frictional loss of the flow-through induced air is to determine the total power of the flow-through induced air as shown in Chapter 13 of "Industrial Dusts" and then use well known fluid mechanics equations to determine the frictional losses of the flow-through induced air. See, P. Drinker, Industrial Dusts ($2^{nd}$ Ed. 1954). In chapter 13, equation (1) for the total power of flow-through induced air is:

$$AHP = \{5.2*Q*[(V_a^2/4000^2)+h_s]\}/33,000 \qquad (1)$$

where:

AHP=total power of the system;

Q=the airflow;

$V_a$=the velocity of the air; and $h_s$=the system resistance.

As subsequently described in chapter 13, $$\{5.2*Q^3*[\{1/(4000)^2*A^2\}+k_s]\} = \{5.2*Q*[(V_a^2/4000^2)+h_s]\} \qquad (2)$$

where $k_s$ the resistance for air flow through an enclosure; and

A=the cross section area of the material stream.

Substituting Equation (2) into Equation (1) the equation for total power becomes:

$$AHP = \{5.2*Q^3*[\{1/(4000)^2*A^2\}+k_s]\}/33,000. \qquad (3)$$

The cross-sectional area of the material stream can be measured. The coefficient $k_s$ can be found in commonly available references such as Chapter 6 Industrial Ventilation, A Manual of Recommended Practice (American Conference of Industrial Hygienists $13^{th}$ Ed.). Q must be determined using known equation to find the flow rate of the induced air flow. One method for determining Q, the flow rate of the induced air flow, is given in Chapter 7 of "Plant and Process Ventilation." See, W. C. L. Hemeon, Plant and Process Ventilation ($2^{nd}$ Ed. 1963). In chapter 7, an equation for $Q^3$ is:

$$Q^3 = (H.P.)*A^2*10^{11} \qquad (4)$$

where:

Q=total flow rate;

H.P.=horse power of the falling material; and

A=the area of the stream of bulk material.

As discussed in chapter 7, H.P. is calculated using an equation dependent on whether the bulk material is falling or is being projected and whether particles in the material stream reach terminal velocity during the fall from first station 101 to second station 102. See, Plant and Process Ventilation, at 125–136. Once H.P. of the stream of bulk material is found, $Q^3$ is determined from the stream of bulk material and is substituted into equation (3) to determine the total power of the flow-through induced air in the system. The frictional losses of flow-through induced air are then determined using fluid mechanics and circulation compartment 201 is sized to have a volume such that the flow resistance of the recirculated induced air is ten times smaller than the calculated flow-through induced air frictional losses.

The suspended particles of bulk material 103 either remain suspended in the air inside circulation compartment 201 or fall back down into bulk material 103 at second station 102 as flow of air dissipates inside compartment 201. Agglomeration also begins to occur as more suspended particles are added to the air inside circulation compartment 201 by the flow of air. In agglomeration, smaller particles of bulk material suspended in the air collide and form bigger, heavier particles of bulk material 103. The force of the flow of air is not sufficient enough to keep the bigger, heavier particles of bulk material 103 suspended in the air and the bigger, heavier particles fall back into bulk material 103 at second station 102. The agglomerated particles that fall back are bigger and heavier and do not become airborne at a later time. The bigger particles are carried out of housing 200 by conveyor belt 120 with the rest of bulk material 103.

Figure 4:
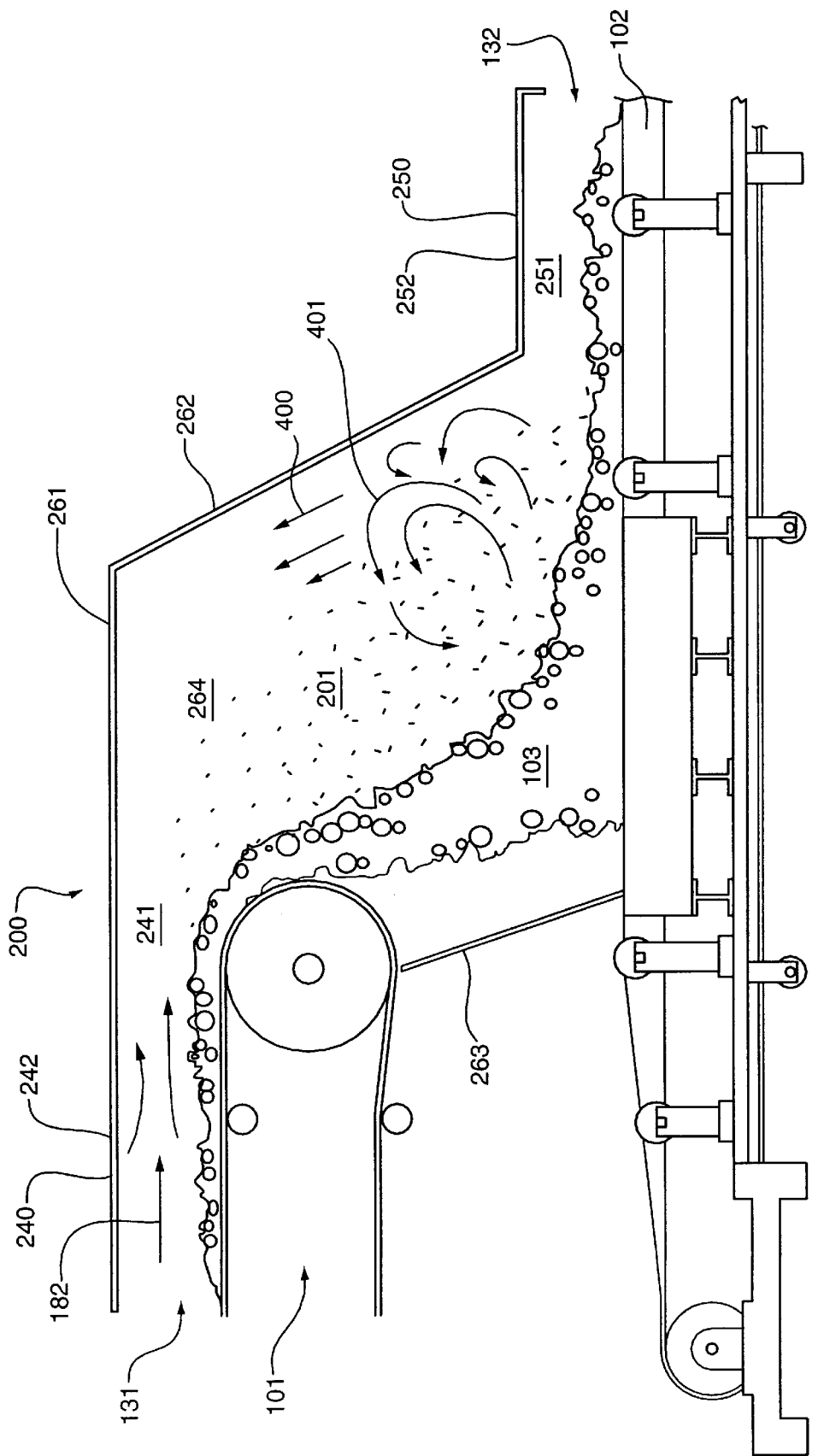
FIG. 4 illustrates a cross sectional view of the first exemplary embodiment showing eddy currents in the induced air flow.

In the preferred exemplary embodiment, it is a problem that eddy currents can be generated in the induced air flow. FIG. 4 illustrates a cross-sectional view of passive dust containment housing 200 to represent the induced air flow and eddy currents in the induced air flow. Induced air flow 400 is the flow of air into the low air pressure area of circulation compartment 201 from the high air pressure region formed by impact of bulk material 203. Eddy currents 401 are turbulent, non-laminar flow caused by the amount of area in circulation compartment 201. These eddy currents flow in a circular non-linear motion and prevent particles from settling or rejoining the stream of material falling from the first station 101 to the second station 102.

Figure 5:
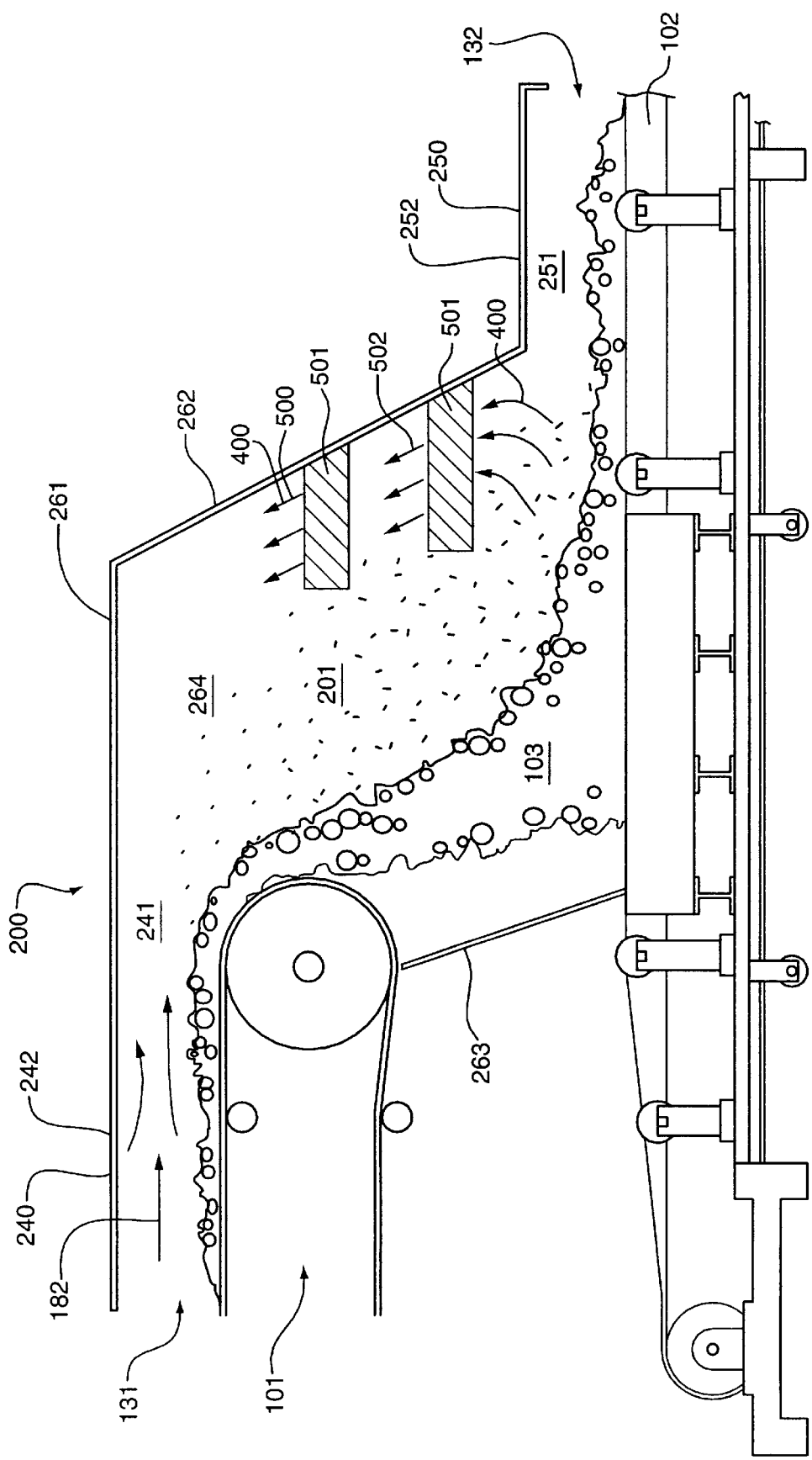
FIG. 5 illustrates a cross sectional view of a second embodiment having laminar flow guide members.
Figure 6:
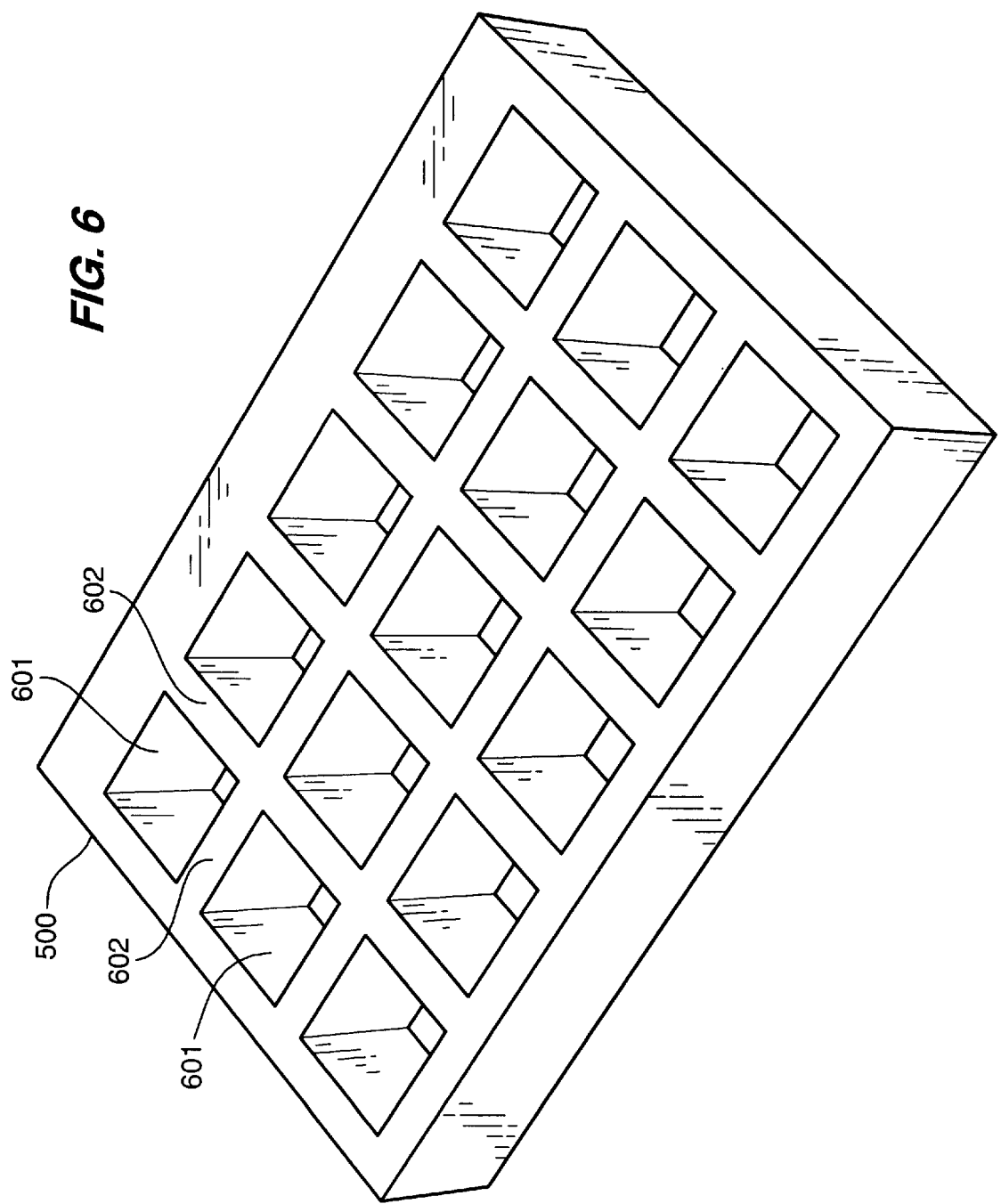
FIG. 6 illustrates a cross sectional view of a laminar flow guide member of the preferred exemplary embodiment.

FIG. 5 illustrates a dust control system having laminar flow guides to prevent eddy currents in circulation compartment 201. Laminar flow guides 500 are affixed to the inside of wall 262 of circulation compartment 201. FIG. 6 discussed below will describe the design of laminar flow guides 500. Laminar flow guides 500 are directional vanes which diffuse the rotating nature of eddy currents and physically redirect the induced air flow to flow upward into circulation compartment 201 in the upward direction of induced air flow 400.

FIG. 6 is a top view of one of laminar flow guides 500. Laminar flow guide 500 is made of a rigid material such as rubber, plastic or material. Each laminar flow guide has a series of air flow openings 601 that allow air to flow through laminar guide 500. In order for passive dust housing 200 to function properly, the total surface areas of the openings 601 must be much greater that the surface area of walls 602. This allows the air flow 400 to flow into circulation compartment 201.

Figure 7:
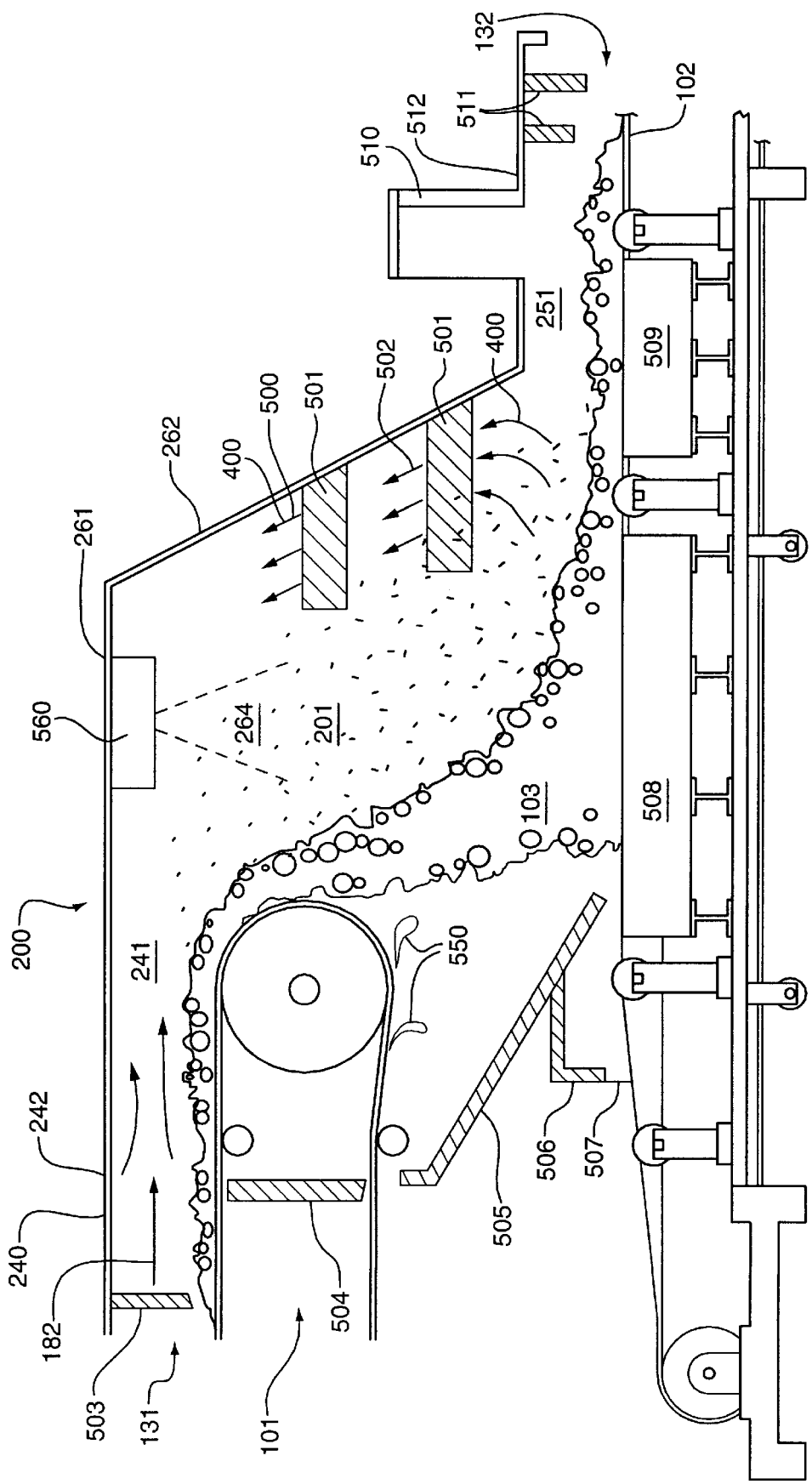
FIG. 7 illustrates a cross sectional view of a preferred exemplary embodiment.

FIG. 7 illustrates one preferred embodiment of this invention. The present invention includes circulation compartment 201 that provides the low pressure area to cause an induced air flow. Circulation compartment 201 includes laminar flow guides 500 to direct air flow up into circulation compartment 201.

To prevent air from flowing into the compartment at first station 101, passive dust housing 700 includes a head curtain 503, between belt seal 504, and tail wall 505. Head curtain 501 is preferably made of a steel plate with a rubber member hanging from the bottom. Between belt seal 504 is a metal piece affixed to supports between the belts to prevent air from entering housing 700 from between the belts in first station 101. Tail wall 505 is fitted to form a seal for the bottom of first station 101. Tail wall 505 may be formed at an angle as shown to form a dribble chute to guide material onto second station 102. The system may also include scrapers 550 for removing excess material from the first station 101 after the material is dropped to the second station 102.

Tail box 506 is an enclosure proximate an end of a conveyor in second station 102. Tail box 506 includes a tail seal curtain 507 that forms an airtight barrier proximate a tail pulley. Tail seal curtain may be formed from a steel plate with a rubber end formed to drag on the conveyor belt. The steel plate is held in place by a clamp which may be made of hard plastic.

Impact bed 508 is a flat plate that may be inserted under a point of impact at second station 102 to prevent the belt from flexing as material lands on the belt. This alleviates some of the dust caused by impact. Belt support 509 is a plate that provides support to a belt in second station 102 to prevent dust leakage.

Dust curtains 511 may be affixed to outlet chute 512. Outlet chute 512 is a covering that may be sized to be long enough to dissipate airflow out of circulation compartment 201. Dust curtains 511 prevent air from flowing out of circulation compartment 201. Dust curtains 511 may be plates of a hard material such as plastic or metal with a rubber bottom. In a preferred embodiment, dust curtains 511 are made of staggered length with the longest curtain near the impact point and the shortest curtain proximate the exit.

A secondary dust capturing system 513 may also be added to outlet chute 512. Secondary dust capturing system may include but not limited to a vacuum filtering system, a chute with a filtration system, or a chute connecting back to circulation compartment 201.

A spaying system 560 may also be installed into circulation compartment 201. The spaying system 560 applies water or other liquid to the material to prevent particles from becoming airborne or to facilitate agglomeration.

The present invention relates to providing a passive dust control system. Although a specific example of a passive dust control system is disclosed for example herein, it is expected that persons skilled in the art can and will design alternative passive dust control systems that are within the scope of the following claims either literally or through the Doctrine of Equivalents.

What is claimed is:

1. Passive dust control apparatus for reducing dust emissions from an outlet in said apparatus during a transfer of a bulk material from a first station to a second station wherein said transfer generates a region of high pressure from an induced airflow caused by particles of material being suspended in air during said transfer, said apparatus comprising:

a housing enclosing said first station and said second station; and means inside said housing for providing a region of low air pressure inside said housing to cause air carrying said particles to flow from said region of high air pressure in said housing to said region of low air pressure inside said housing wherein said particles fall out of said air in said region of low air pressure into said bulk material inside said housing.

2. The passive dust control apparatus of claim 1 wherein said means for providing a region of low air pressure comprises:

a circulation compartment inside said housing.

3. The passive dust control apparatus of claim 2 further comprising:

an induced air flow having a certain velocity pressure caused by said transfer of said bulk material; and said volume of said circulation compartment being proportional to said velocity pressure of said induced air flow.

4. The passive dust control apparatus of claim 3 wherein said volume of said circulation compartment is at least 10 times greater than said velocity pressure of said induced air flow.

5. The passive dust control apparatus of claim 2 further comprising:

air in said circulation compartment becoming saturated with said particles of bulk material responsive to said air in said region of high air pressure flowing into to said region of low air pressure; and said particles agglomerating in said circulation compartment and settling into said bulk material at said second station.

6. The apparatus of claim 2 further comprising:

means for guiding said airflow from said region of high air pressure into said region of low air pressure in said circulation compartment.

7. The apparatus of claim 6 wherein said means for guiding comprises:

laminar air flow guides.

8. The apparatus of claim 7 wherein said laminar air flow guides comprise:

a base made of rigid material having a first side proximate said region of high air pressure and a second side; and a plurality of openings from said first side to said second side in said base for directing said air through said laminar air flow guide wherein the surface area of said openings is greater than the surface area of said material in said base.

9. The passive dust control apparatus of claim 1 further comprising:

means for facilitating agglomeration of said particles of said bulk material suspended in said air inside said region of low air pressure.

10. The passive dust control apparatus of claim 1 further comprising:

means for creating a flow path for said air from said second station back to said first station.

11. The passive dust control system of claim 10 further comprising:

a circulation compartment inside said housing.

12. The passive dust control system of claim 1 further comprising:

means for preventing air from entering said housing proximate said first station.

13. The passive dust control system of claim 12 wherein said means for preventing comprises:

a head chute over said first station; and a head curtain hanging from said head chute.

14. The passive dust control system of claim 12 further comprising:

a belt seal between a first and an second side of a conveyor belt.

15. The passive dust control system of claim 12 wherein said means for preventing comprises:

a back wall seal under a bottom side of a conveyor belt at said first station.

16. The passive dust control system of claim 15 wherein said back wall seal forms a dribble chute.

17. The passive dust control system of claim 1 further comprising:
a tail box over a tail end of a conveyor belt in said second station to prevent dust from escaping.

18. The passive dust control system of claim 17 further comprising:
a tail curtain that hangs over said tail end of said conveyor belt to prevent air from entering or escaping.

19. The passive dust control system of claim 1 further comprising:
an impact bed under an impact point to prevent flexing of a conveyor belt.

20. The passive dust control system of claim 1 further comprising:
belt support plates under a conveyor belt at said second station.

21. The passive dust control system of claim 1 further comprising:
an outlet chute that is fitted over said second station.

22. The passive dust control system of claim 21 wherein said outlet cute is of a sufficient length to dissipate airflow.

23. The passive dust control system of claim 21 further comprising:
dust curtains hanging from said outlet chute to prevent air from flowing out of said housing.

24. The passive dust control system of claim 21 further comprising:
a secondary dust containment system.

25. The passive dust control system of claim 24 wherein said secondary dust containment system is a duct for circulating air back into said housing.

26. The passive dust control system of claim 24 wherein said secondary dust containment system is a duct leading to a filtration system.

27. The passive dust control system of claim 1 further comprising:
scrapers for removing excess material from a conveyor belt at said first station.

28. The passive dust control system of claim 1 further comprising:
a system for wetting said particles in said air.

29. An apparatus for passively controlling dust emissions from said apparatus during a transfer of bulk material from a first station to a second station inside said apparatus, said apparatus comprising:
a housing enclosing said first and second station;
a first opening in said housing for receiving said bulk material at said first station;
a second opening in said housing for transferring said bulk material from said second station to a subsequent processing means;
a circulation compartment inside said housing;
a region of low air pressure inside said circulation compartment wherein said air inside said housing moving from said region of high air pressure to said region of low air pressure causing said particles of said bulk material suspended in said air settling out of said air in said circulation compartment into said bulk material at said second station.

* * * * *